(12) United States Patent
Ikeda et al.

(10) Patent No.: US 11,355,767 B2
(45) Date of Patent: Jun. 7, 2022

(54) FUEL CELL STACK

(71) Applicant: HONDA MOTOR CO., LTD., Tokyo (JP)

(72) Inventors: Yuta Ikeda, Wako (JP); Naoki Inoue, Wako (JP); Hideharu Naito, Wako (JP); Norihisa Kobayashi, Wako (JP); Kimiharu Mizusaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 16/819,229

(22) Filed: Mar. 16, 2020

(65) Prior Publication Data
US 2020/0303754 A1     Sep. 24, 2020

(30) Foreign Application Priority Data

Mar. 18, 2019  (JP) .............................. JP2019-049500

(51) Int. Cl.
| | | |
|---|---|---|
| *H01M 8/1004* | (2016.01) | |
| *H01M 8/248* | (2016.01) | |
| *H01M 8/04828* | (2016.01) | |
| *H01M 8/0206* | (2016.01) | |
| *H01M 8/0284* | (2016.01) | |
| *H01M 8/04858* | (2016.01) | |

(52) U.S. Cl.
CPC ....... *H01M 8/1004* (2013.01); *H01M 8/0206* (2013.01); *H01M 8/0284* (2013.01); *H01M 8/0494* (2013.01); *H01M 8/248* (2013.01)

(58) Field of Classification Search
None
See application file for complete search history.

(56) References Cited

U.S. PATENT DOCUMENTS

| | | | |
|---|---|---|---|
| 2002/0102453 A1 | 8/2002 | Suenaga et al. | |
| 2017/0012300 A1* | 1/2017 | Gaugler | .............. H01M 8/2483 |
| 2018/0040907 A1* | 2/2018 | Ishida | ................... H01M 8/247 |
| 2020/0212472 A1* | 7/2020 | Ikeda | ................... H01M 8/0206 |

FOREIGN PATENT DOCUMENTS

| | | |
|---|---|---|
| JP | 2002-305006 | 10/2002 |
| JP | 2015-191802 | 11/2015 |

\* cited by examiner

*Primary Examiner* — Christopher P Domone
(74) *Attorney, Agent, or Firm* — Amin, Turocy & Watson, LLP

(57) ABSTRACT

A fuel cell stack includes a cell stack body including a plurality of stacked power generation cells together. A metal plate and an elastic seal member are overlapped with each other at a position facing a bead seal formed on an end metal separator. A support member includes a recess accommodating the metal plate. A gap is provided between an inner peripheral end of the metal plate and the recess, or between an outer peripheral end of the metal plate and the recess, for absorbing thermal expansion difference between the metal plate and the support member.

11 Claims, 15 Drawing Sheets

FUEL CELL STACK

CROSS-REFERENCE TO RELATED APPLICATION

This application is based upon and claims the benefit of priority from Japanese Patent Application No. 2019-049500 filed on Mar. 18, 2019, the contents of which are incorporated herein by reference.

BACKGROUND OF THE INVENTION

Field of the Invention

The present invention relates to a fuel cell stack including a cell stack body formed by stacking a plurality of power generation cells each having a membrane electrode assembly and a metal separator together.

Description of the Related Art

For example, a solid polymer electrolyte fuel cell includes a membrane electrode assembly (MEA). The membrane electrode assembly includes an electrolyte membrane, an anode provided on one surface of the electrolyte membrane, and a cathode provided on the other surface of the electrolyte membrane. The electrolyte membrane is a polymer ion exchange membrane. The membrane electrode assembly is sandwiched between separators (bipolar plates) to form a power generation cell. For example, a fuel cell stack including a stack body including a predetermined number of the stacked power generation cells is mounted in a fuel cell vehicle (fuel cell electric automobile, etc.).

In the fuel cell stack, as the separators, metal separator may be used. In this regard, the metal separators are provided with seal members, for preventing leakage of reactant gases (an oxygen-containing gas and a fuel gas) and a coolant (e.g., see Japanese Laid-Open Patent Publication No. 2002-305006). Elastic rubber seals such as fluorine based seals or silicone seals are used as the seal members. Therefore, the cost is pushed up disadvantageously.

In an attempt to address the problem, for example, as disclosed in Japanese Laid-Open Patent Publication No. 2015-191802, it has been common to adopt structure where, instead of the elastic rubber seals, bead seals are formed in metal separators.

SUMMARY OF THE INVENTION

The present invention has been made in relation to the above conventional technique, and an object of the present invention is to provide a fuel cell stack which makes it possible to achieve the desired sealing performance at an end of a cell stack body in a stacking direction.

According to an aspect of the present invention, a fuel cell stack includes a cell stack body including a plurality of power generation cells stacked in a stacking direction, the power generation cells each including a membrane electrode assembly and metal separators provided on both sides of the membrane electrode assembly, respectively, wherein The cell stack body includes end metal separators positioned at both ends of the power generation cells in the stacking direction, A bead seal is formed integrally with each of the end metal separators, the bead seal protruding outward in the stacking direction in order to prevent leakage of fluid, a metal plate and an elastic seal member are overlapped with each other at positions facing the bead seal, and the metal plate has a frame shape, and is supported by a support member made of resin and provided between the bead seal and the elastic seal member, the support member has a recess accommodating the metal plate, and a gap is provided between an inner peripheral end of the metal plate and the recess, or between an outer peripheral end of the metal plate and the recess, for absorbing thermal expansion difference between the metal plate and the support member.

In the fuel cell stack of the present invention, the metal plate and the elastic seal member are overlapped with each other between the end metal separator and the support member. Therefore, inclination of the bead seal is prevented, and it is possible to achieve the desired sealing performance in the bead seal. Further, the gap is provided between the recess for attaching the metal plate provided in the support member and outer periphery or inner periphery of the metal plate having the frame shape. In the structure, it is possible to prevent damage of the support member due to the thermal expansion difference between the metal plate and the support member which occurs during operation (power generation) of the fuel cell stack, and maintain the desired sealing performance.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell stack according to the present invention will be described with reference to the accompanying drawings.

Figure 1:
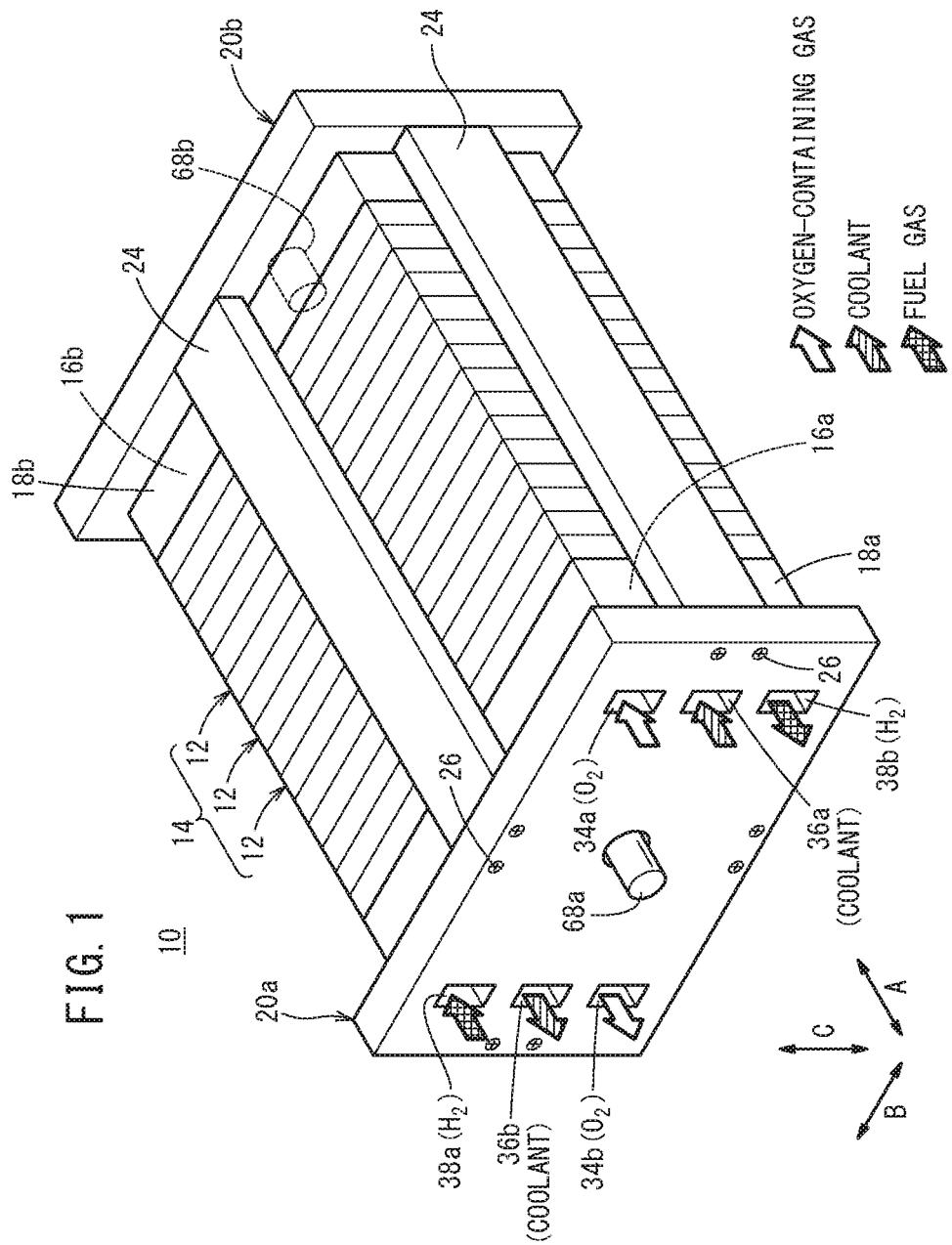
FIG. 1 is a perspective view showing a fuel cell stack according to an embodiment of the present invention.
Figure 2:
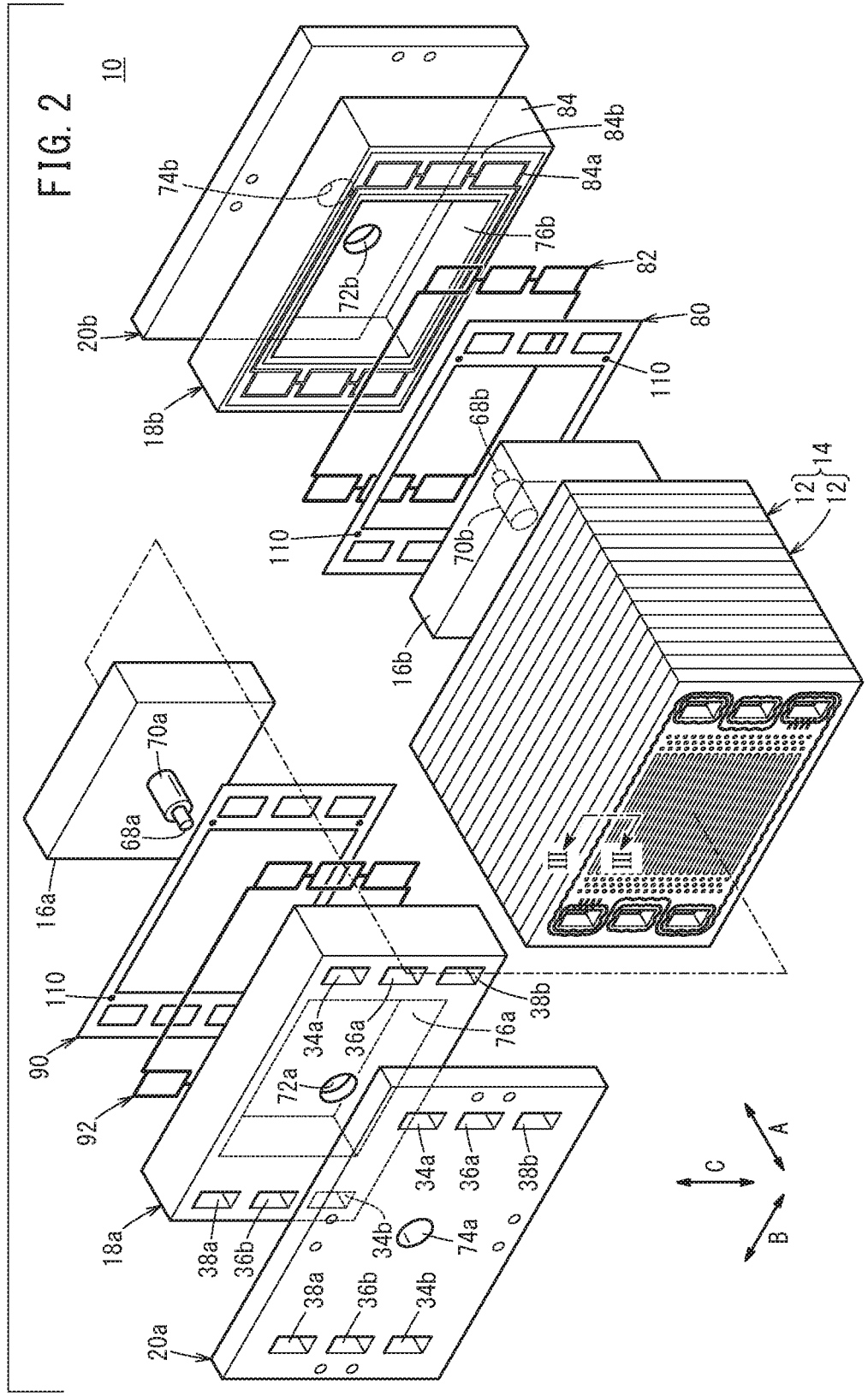
FIG. 2 is a partial exploded schematic perspective view showing the fuel cell stack.

As shown in FIGS. 1 and 2, a fuel cell stack 10 according to an embodiment of the present invention includes a stack body 14 formed by stacking a plurality of power generation cells 12 together in a horizontal direction (indicated by an arrow A). It should be noted that the cell stack body 14 may be formed by stacking a plurality of power generation cells 12 in the gravity direction (indicated by an arrow C). For example, the fuel cell stack 10 is mounted in a fuel cell vehicle such as a fuel cell electric automobile (not shown).

In FIG. 2, at one end of the cell stack body 14 in a stacking direction (indicated by an arrow A), a terminal plate 16a is provided. An insulator 18a is provided outside the terminal plate 16a, and an end plate 20a is provided outside the insulator 18a. At the other end of the cell stack body 14 in the stacking direction, a terminal plate 16b is provided. An insulator 18b is provided outside the terminal pate 16b, and an end plate 20b is provided outside the insulator 18b.

As shown in FIG. 1, each of the end plates 20a, 20b has a laterally elongated (or longitudinally elongated) rectangular shape. Coupling bars 24 are positioned between the sides of the end plates 20a, 20b. Both ends of each of the coupling bars 24 are fixed to inner surfaces of the end plates 20a, 20b through bolts 26, to apply a tightening load in the stacking direction (indicated by the arrow A) to the plurality of power generation cells 12 that are stacked together. It should be noted that the fuel cell stack 10 may include a casing including the end plates 20a, 20b, and the cell stack body 14 may be placed in the casing.

Figure 3:
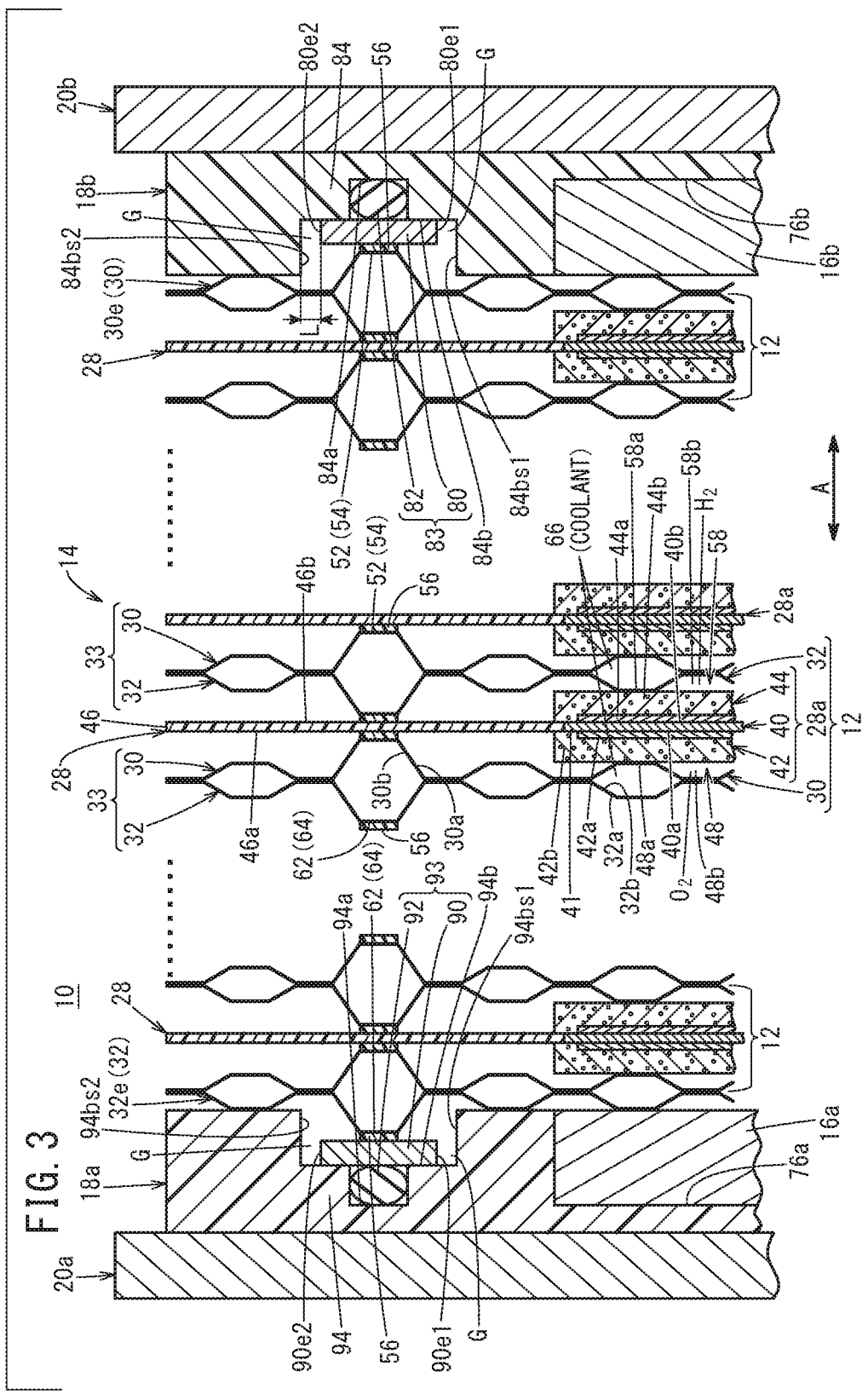
FIG. 3 is a cross sectional view taken along a line III-III in FIG. 2.
Figure 4:
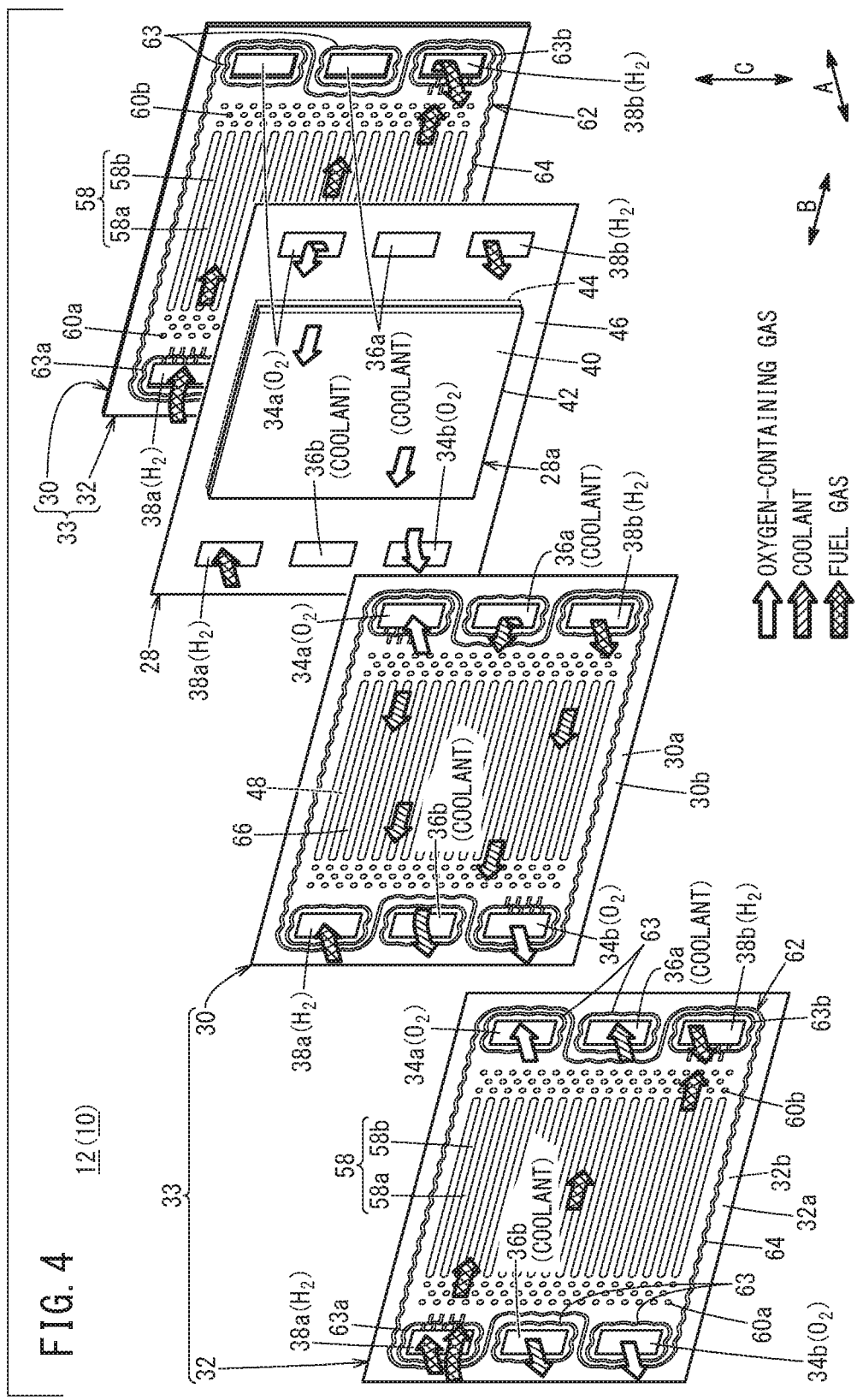
FIG. 4 is an exploded perspective view showing a power generation cell of the fuel cell stack.

As shown in FIGS. 3 and 4, the power generation cell 12 includes a resin film equipped MEA (membrane electrode assembly) 28, and a first metal separator 30 and a second metal separator 32 sandwiching the resin film equipped MEA 28 from both sides.

Each of the first metal separator 30 and the second metal separator 32 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. Outer ends of the first metal separator 30 and the second metal separator 32 are joined together by welding, brazing, crimpling, etc. to form a joint separator 33.

At one end of the power generation cell 12 in a long side direction indicated by an arrow B (horizontal direction in FIG. 4), an oxygen-containing gas supply passage 34a, a coolant supply passage 36a, and a fuel gas discharge passage 38b are arranged in a direction indicated by an arrow C. The oxygen-containing gas supply passage 34a, the coolant supply passage 36a, and the fuel gas discharge passage 38b extend through the power generation cell 12 in the direction indicated by the arrow A. An oxygen-containing gas is supplied through the oxygen-containing gas supply passage 34a. A coolant is supplied through the coolant supply passage 36a. A fuel gas such as a hydrogen-containing gas is discharged through the fuel gas discharge passage 38b.

At the other end of the power generation cell 12 in the direction indicated by the arrow B, a fuel gas supply passage 38a, a coolant discharge passage 36b, and an oxygen-containing gas discharge passage 34b are arranged in the direction indicated by the arrow C. The fuel gas supply passage 38a, the coolant discharge passage 36b, and the oxygen-containing gas discharge passage 34b extend through the power generation cell 12 in the direction indicated by the arrow A. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b are not limited to the illustrated embodiment, and may be determined as necessary depending on the required specification.

As shown in FIG. 3, the resin film equipped MEA 28 includes a membrane electrode assembly 28a, and a resin film 46 joined to an outer peripheral portion of the membrane electrode assembly 28a. The membrane electrode assembly 28a includes an electrolyte membrane 40, and a cathode 42 and an anode 44 provided on both sides of the electrolyte membrane 40. For example, the electrolyte membrane 40 is a solid polymer electrolyte membrane (cation ion exchange membrane) which is a thin membrane of perfluorosulfonic acid containing water. A fluorine based electrolyte may be used as the electrolyte membrane 40. Alternatively, an HC (hydrocarbon) based electrolyte may be used as the electrolyte membrane 40. The surface size (outer size) of the electrolyte membrane 40 is smaller than the surface sizes (outer sizes) of the cathode 42 and the anode 44.

The cathode 42 includes a first electrode catalyst layer 42a joined to one surface 40a of the electrolyte membrane 40, and a first gas diffusion layer 42b stacked on the first electrode catalyst layer 42a. The outer size of the first electrode catalyst layer 42a is smaller than the outer size of the first gas diffusion layer 42b, and the same as, or less than the outer size of the electrolyte membrane 40. It should be noted that the outer size of the first electrode catalyst layer 42a may be the same as the outer size of the electrolyte membrane 40, and may be the same as the outer size of the first gas diffusion layer 42b. The anode 44 includes a second electrode catalyst layer 44a joined to another surface 40b of the electrolyte membrane 40, and a second gas diffusion layer 44b stacked on the second electrode catalyst layer 44a. The outer size of the second electrode catalyst layer 44a is smaller than the outer size of the second gas diffusion layer 44b, and the same as or less than the outer size of the electrolyte membrane 40. It should be noted that the outer size of the second electrode catalyst layer 44a may be the same as the outer size of the electrolyte membrane 40, and may be the same as the outer size of the second gas diffusion layer 44b.

The first electrode catalyst layer 42a is formed by depositing porous carbon particles uniformly on the surface of the first gas diffusion layer 42b, and platinum alloy is supported on surfaces of the carbon particles. The second electrode catalyst layer 44a is formed by depositing porous carbon particles uniformly on the surface of the second gas diffusion layer 44b, and platinum alloy is supported on surfaces of the carbon particles. Each of the first gas diffusion layer 42b and the second gas diffusion layer 44b comprises a carbon paper, a carbon cloth, etc.

The resin film 46 having a frame shape (quadrangular ring shape) is held between an outer front marginal portion of the first gas diffusion layer 42b and an outer front marginal portion of the second gas diffusion layer 44b. An inner end surface of the resin film 46 is positioned close to, or contacts an outer end surface of the electrolyte membrane 40.

As shown in FIG. 4, at one end of the resin film 46 in the direction indicated by the arrow B, the oxygen-containing gas supply passage 34a, the coolant supply passage 36a, and the fuel gas discharge passage 38b are provided. At the other end of the resin film 46 in the direction indicated by the arrow B, the fuel gas supply passage 38a, the coolant discharge passage 36b, and the oxygen-containing gas discharge passage 34b are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. It should be noted that the electrolyte membrane 40 may protrude outward without using the resin film 46. Further, frame shaped films may be provided on both sides of the electrolyte membrane 40 which protrudes outward.

As shown in FIG. 4, the first metal separator 30 has an oxygen-containing gas flow field 48 on its surface 30a facing the resin film equipped MEA 28. For example, the oxygen-containing gas flow field 48 extends in the direction indicated by the arrow B.

Figure 5:
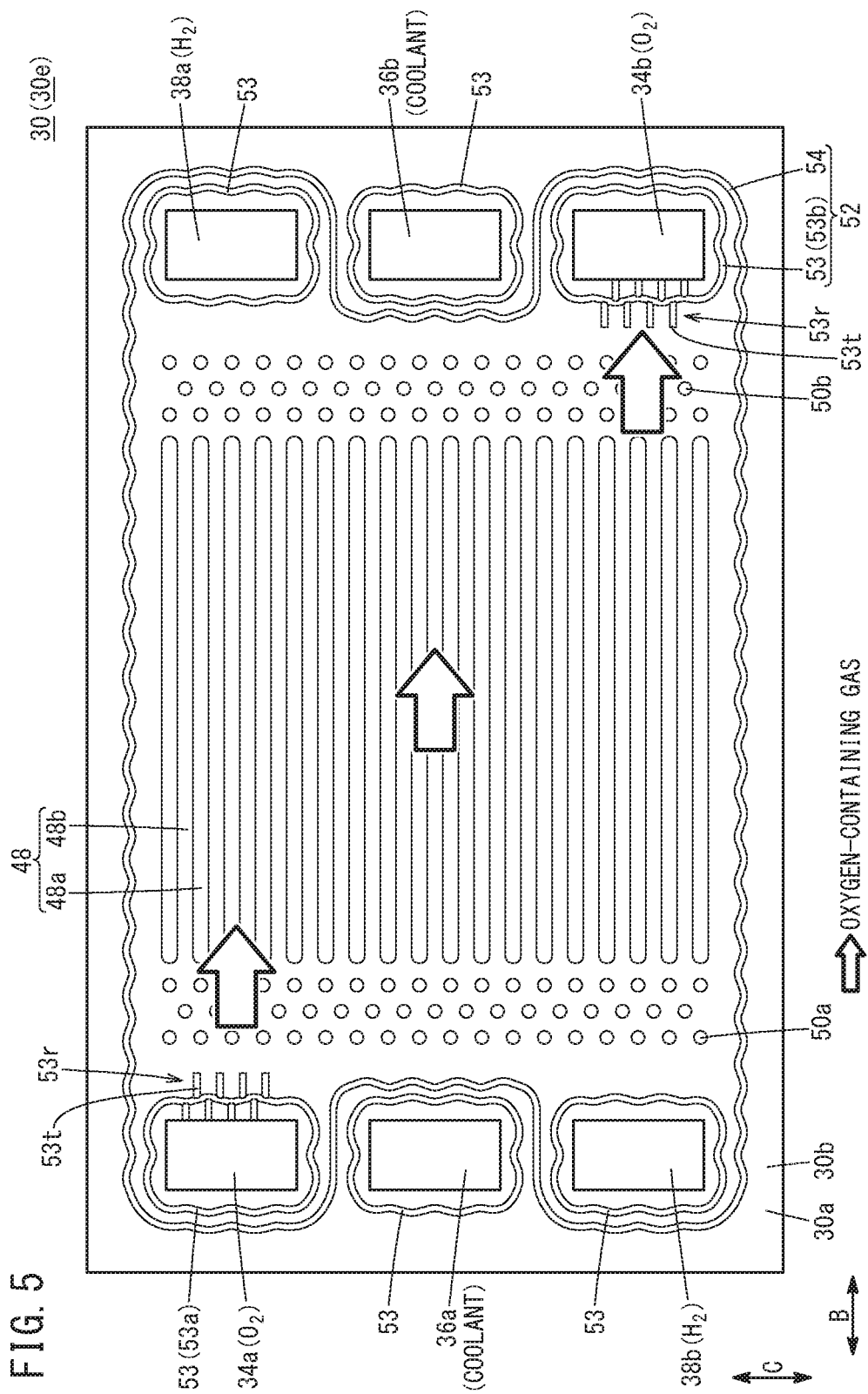
FIG. 5 is a front view showing a first metal separator (first end metal separator)

As shown in FIG. 5, the oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending straight in the direction indicated by the arrow B. The ridges 48a and the flow grooves 48b may extend in a wavy pattern in a plan view viewed in the stacking direction.

An inlet buffer 50a having a plurality of bosses is provided between the oxygen-containing gas supply passage 34a and the oxygen-containing gas flow field 48. An outlet buffer 50b having a plurality of bosses is provided between the oxygen-containing gas discharge passage 34b and the oxygen-containing gas flow field 48.

A first bead seal 52 is formed on the surface 30a of the first metal separator 30 by press forming. The first bead seal 52 protrudes toward the resin film equipped MEA 28 (FIG. 1). A resin member 56 (FIG. 3) is fixed to a ridge shaped front end surface of the first bead seal 52 by printing or coating. It should be noted that the resin member 56 may be dispensed with. The resin member 56 may be made of rubber material.

As shown in FIG. 3, the first bead seal 52 has a shape narrowed toward its front end in cross section. The front end of the first bead seal 52 has a flat shape. Alternatively, the front end of the first bead seal 52 may have a ridge like R-shape.

As shown in FIG. 5, the first bead seal 52 includes a plurality of bead seals 53 (hereinafter referred to as the "passage beads 53") provided around the plurality of fluid passages (oxygen-containing gas supply passage 34a, etc.), respectively, and a bead seal 54 (hereinafter referred to as the "outer bead 54") provided around the oxygen-containing gas flow field 48, the inlet buffer 50a, and the outlet buffer 50b. The passage beads 53 and the outer bead 54 have a wavy shape in a plan view viewed in the thickness direction of the first metal separator 30. The passage beads 53 and the outer bead 54 may have a straight shape in a plan view.

The plurality of passage beads 53 protrude from the surface 30a of the first metal separator 30 toward the MEA 28, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b".

Bridge sections 53r are provided in the first metal separator 30. The bridge sections 53r connect the inside (fluid passages 34a, 34b) and the outside (oxygen-containing gas flow field 48) of the passage beads 53a, 53b provided respectively around the fluid passages 34a, 34b. The passage bead 53a around the oxygen-containing gas supply passage 34a includes a bridge section 53r on its side part adjacent to the oxygen-containing gas flow field 48. The passage bead 53b around the oxygen-containing gas discharge passage 34b includes a bridge section 53r on its side part adjacent to the oxygen-containing gas flow field 48.

The bridge section 53r includes a plurality of tunnels 53t inside and outside of the passage beads 53a, 53b, respectively. The tunnels 53t are formed by press forming, and protrude from the surface 30a of the first metal separator 30 toward the resin film equipped MEA 28. Holes (not shown) as passages of the oxygen-containing gas are provided at front ends of the tunnels 53t adjacent to the oxygen-containing gas flow field 48.

As shown in FIG. 3, the resin member 56 is fixed to a ridge shaped front end surface of the first bead seal 52 by printing or coating. For example, plastic material such as polyester may be used for the resin member 56. Alternatively, as the resin member 56, punched out sheets having the plane surface shapes of the outer bead 54 and the passage beads 53 may be attached to the first metal separator 30. The resin member 56 may be provided as necessary. The resin member 56 may be dispensed with.

Figure 6:
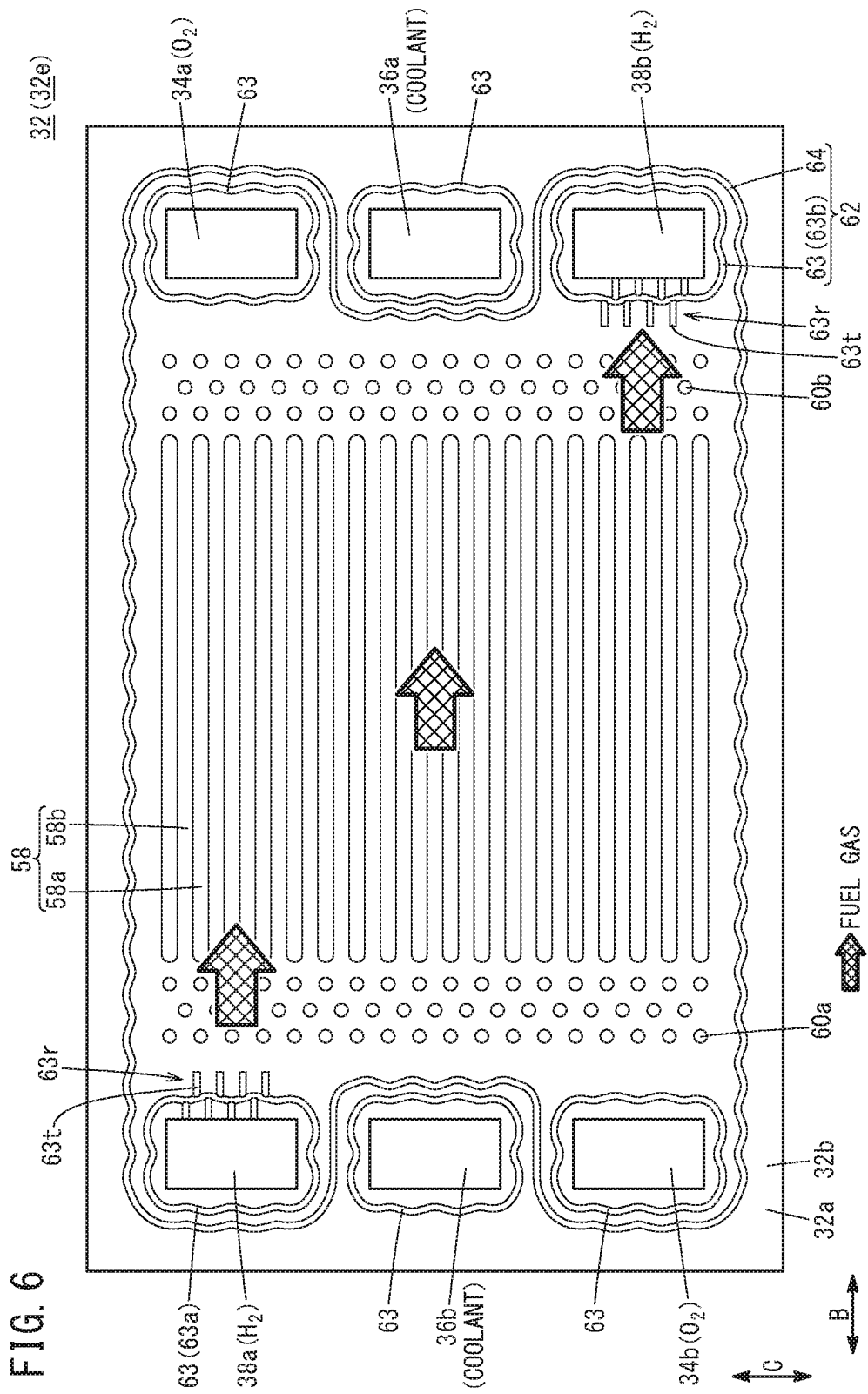
FIG. 6 is a front view showing a second metal separator (second end metal separator)

As shown in FIG. 4, the second metal separator 32 has a fuel gas flow field 58 on its surface 32a facing the resin film equipped MEA 28. For example, the fuel gas flow field 58 extends in the direction indicated by the arrow B. As shown in FIG. 6, the fuel gas flow field 58 is connected to (in fluid communication with) the fuel gas supply passage 38a and the fuel gas discharge passage 38b. The fuel gas flow field 58 includes straight flow grooves 58b between a plurality of ridges 58a extending straight in the direction indicated by the arrow B. The ridges 58a and the flow grooves 58b may extend in a wavy pattern in a plan view viewed in the stacking direction.

An inlet buffer 60a having a plurality of bosses is provided between the fuel gas supply passage 38a and the fuel gas flow field 58. An outlet buffer 60b having a plurality of bosses is provided between the fuel gas discharge passage 38b and the fuel gas flow field 58.

A second bead seal 62 is formed on the surface 32a of the second metal separator 32 by press forming. The second bead seal 62 protrudes toward the resin film equipped MEA 28 (FIG. 1).

As shown in FIG. 3, the second bead seal 62 has a narrowed shape toward its front end in cross section. The front end of the second bead seal 62 has a flat shape. Alternatively, the front end of the second bead seal 62 may have a ridge like R-shape.

As shown in FIG. 6, the second bead seal 62 includes a plurality of bead seals 63 (hereinafter referred to as the "passage beads 63") provided around the plurality of fluid passages (fuel gas supply passages 38a, etc.), respectively, and bead seals 64 (hereinafter referred to as the "outer bead 64") provided around the fuel gas flow field 58, the inlet buffer 60a, and the outlet buffer 60b. The passage beads 63 and the outer bead 64 have a wavy pattern in a plan view viewed in the thickness direction of the second metal separator 32. The passage beads 63 and the outer bead 64 may have a straight shape in a plan view (shape including a straight shape).

The plurality of passage beads 63 protrude from the surface 32a of the second metal separator 32 toward the MEA 28, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Hereinafter, among the plurality of passage beads 63, the passage bead formed around the fuel gas supply passage 38a will be referred to as a "passage bead 63a", and the passage bead formed around the fuel gas discharge passage 38b will be referred to as a "passage bead 63b".

Bridge sections 63r are provided in the second metal separator 32. The bridge sections 63r connect the inside (fluid passages 38a, 38b) and the outside (fuel gas flow field 58) of the passage beads 63a, 63b provided respectively around the fluid passages 38a, 38b. The passage bead 63a around the fuel gas supply passage 38a includes the bridge section 63r on its side part adjacent to the fuel gas flow field 58. The passage bead 63b around the fuel gas discharge passage 38b includes the bridge section 63r on its side part adjacent to the fuel gas flow field 58.

The bridge section 63r includes a plurality of tunnels 63t inside and the outside of the passage beads 63a, 63b. The tunnels 63t is formed by press forming, and protrudes from the surface 32a of the second metal separator 32 toward the resin film equipped MEA 28. Holes (not shown) as passages of the oxygen-containing gas are provided at front ends of the tunnels 63t adjacent to the fuel gas flow field 58.

As shown in FIG. 3, the resin member 56 is fixed to a ridge shaped front end surface of the second bead seal 62 by printing or coating. For example, plastic material such as polyester may be used for the resin member 56. The resin member 56 may be made of rubber material. Alternatively, as the resin member 56, punched out sheets having the plane surface shapes of the outer bead 64 and the passage beads 63 may be attached to the second metal separator 32. The resin member 56 may be provided as necessary. The resin member 56 may be dispensed with.

As shown in FIG. 4, a coolant flow field 66 is formed between a surface 30b of the first metal separator 30 and a surface 32b of the second metal separator 32 that are joined together. The coolant flow field 66 is connected to (in fluid communication with) the coolant supply passage 36a and the coolant discharge passage 36b. When the first metal separator 30 having the oxygen-containing gas flow field 48 on its front surface and the second metal separator 32 having the fuel gas flow field 58 on its front surface are stacked together, the coolant flow field 66 is formed between the back surface of the oxygen-containing gas flow field 48 and the back surface of the fuel gas flow field 58.

As shown in FIG. 3, the cell stack body 14 includes a first end metal separator 30e and a second end metal separator 32e provided at both ends in the stacking direction indicated by the arrow A. The second end metal separator 32e is positioned at one end of the cell stack body 14 in the stacking direction (end closer to the insulator 18a and the end plate 20a), and the first end metal separator 30e is positioned at the other end of the cell stack body 14 in the stacking direction (end closer to the insulator 18b and the end plate 20b).

In FIGS. 3 and 5, the first end metal separator 30e has the same structure as the first metal separator 30 which contacts a surface 46a of the resin film 46 of the resin film equipped MEA 28 oriented to one end in the stacking direction (closer to the insulator 18a and the end plate 20a). Therefore, the detailed description about the first end metal separator 30e will be omitted.

In FIGS. 3 and 6, the second end metal separator 32e has the same structure as the second metal separator 32 which contacts a surface 46b of the resin film 46 of the resin film equipped MEA 28 oriented to the other end in the stacking direction (closer to the insulator 18b and the end plate 20b). Therefore, the detailed description about the second end metal separator 32e will be omitted.

In FIG. 2, the terminal plates 16a, 16b are made of electrically conductive material. For example, the terminal plates 16a, 16b are made of metal such as copper, aluminum, or stainless steel. Terminals 68a, 68b are provided at substantially the center of the terminal plates 16a, 16b, and the terminals 68a, 68b extend outward in the stacking direction.

The terminal 68a is inserted into an insulating cylindrical body 70a to penetrate through a hole 72a of the insulator 18a and a hole 74a of the end plate 20a, and protrudes to the outside of the end plate 20a. The terminal 68b is inserted into an insulating cylindrical body 70b to penetrate through a hole 72b of the insulator 18b and a hole 74b of the end plate 20b, and protrudes to the outside of the end plate 20b.

The insulators 18a, 18b are made of insulating material such as polycarbonate (PC), phenol resin, etc. Recesses 76a, 76b opened toward the cell stack body 14 are formed at the center of the insulators 18a, 18b, and the holes 72a, 72b are formed at the bottoms of the recesses 76a, 76b, respectively.

At one end of the insulator 18a and the end plate 20a indicated by the arrow B, the oxygen-containing gas supply passage 34a, the coolant supply passage 36a, and the fuel gas discharge passage 38b are provided. At the other end of the insulator 18a and the end plate 20a indicated by the arrow B, the fuel gas supply passage 38a, the coolant discharge passage 36b, and the oxygen-containing gas discharge passage 34b are provided.

As shown in FIG. 3, at one end of the cell stack body 14 in the stacking direction (end closer to the insulator 18b), a first metal plate 80 and a first elastic seal member 82 are overlapped with each other at positions facing the first bead seal 52. The first metal plate 80 and the first elastic seal member 82 form a first seal member 83. The cross sectional shape of the first elastic seal member 82 is not limited to a circular shape. For example, the cross sectional shape of the first elastic seal member 82 may be a polygonal shape such as a quadrangular shape, or may be any other shape.

The first metal plate 80 is supported by an electrically insulating support member 84, and provided between the first bead seal 52 and the first elastic seal member 82. The first metal plate 80 contacts the support member 84, and the first metal plate 80 is slidable in a direction perpendicular to the stacking direction (indicated by the arrow A) relative to the support member 84. The ridge of the first bead seal 52 and the first elastic seal member 82 are provided at positions which are overlapped with each other as viewed in the stacking direction of the cell stack body 14.

The first metal plate 80 and the first end metal separator 30e are made of the same kind of metal material. For example, both of the first end metal separator 30e and the first metal plate 80 are made of stainless based material. Preferably, the first metal plate 80 and the first end metal separator 30e are made of the same material. However, as long as the first metal plate 80 and the first end metal separator 30e have substantially the same linear expansion coefficient, the first metal plate 80 and the first end metal separator 30e may be made of materials of different compositions.

The support member 84 has a groove 84a which accommodates the first elastic seal member 82. The groove 84a is provided at a position facing the first bead seal 52. The first metal plate 80 is provided to extend across the groove 84a. The first elastic seal member 82 is elastically compressed, and in this state, the first elastic seal member 82 is held between the first metal plate 80 and the bottom of the groove 84a. Therefore, the first elastic seal member 82 tightly contacts the first metal plate 80 and the bottom of the groove 84a to form an air-tight seal.

The support member 84 includes a recess 84b having the groove 84a. The first metal plate 80 is accommodated in the recess 84b. A gap G for allowing thermal expansion of the first metal plate 80 is provided between an inner peripheral end 80e1 of the first metal plate 80 and a side wall surface 84bs1 of the recess 84b facing the inner peripheral end 80e1. A gap G for allowing thermal expansion of the first metal plate 80 is provided between an outer peripheral end 80e2 of the first metal plate 80 and a side wall surface 84bs2 of the recess 84b facing the outer peripheral end 80e2. That is, the gap G provided on each of the inner peripheral side and the outer peripheral side of the first metal plate 80 is a buffer which absorbs heat expansion difference between the first metal plate 80 and the support member 84. The gap G is provided over the entire periphery on the inner peripheral side and the outer peripheral side of the first metal plate 80. For example, the size L of the gap G in the width direction of the recess 84b is in the range of 0.5 to 2.0 mm, and preferably, in the range of 1.0 to 1.5 mm. The recess 84b surrounds the recess 76b accommodating the terminal plate 16b over the entire periphery.

The resin member 56 is interposed between the ridge of the first bead seal 52 and the first metal plate 80. The resin member 56 contacts the first metal plate 80.

The support member 84 is part of the insulator 18b. That is, the support member 84 is formed integrally with the insulator 18b. It should be noted that the support member 84 may be a member (e.g., frame member surrounding the outer periphery of the insulator 18b) provided separately from the insulator 18b.

At the other end of the cell stack body 14 in the stacking direction (end closer to the insulator 18a), a second metal plate 90 and a second elastic seal member 92 are overlapped with each other at a position facing the second bead seal 62. The second metal plate 90 and the second elastic seal member 92 form a second seal member 93.

The second metal plate 90 is supported by an electrically insulating support member 94, and provided between the second bead seal 62 and the second elastic seal member 92. The second metal plate 90 contacts the support member 94, and the second metal plate 90 is slidable in a direction perpendicular to the stacking direction (indicated by the arrow A) relative to the support member 94. The ridge of the second bead seal 62 and the second elastic seal member 92 are provided at positions which are overlapped with each other as viewed in the stacking direction of the cell stack body 14.

The second metal plate 90 and the second end metal separator 32e are made of the same kind of metal material. For example, both of the second end metal separator 32e and the second metal plate 90 are made of stainless based material. Preferably, the second metal plate 90 and the second end metal separator 32e are made of the same material. However, as long as the second metal plate 90 and the second end metal separator 32e have substantially the same linear expansion coefficient, the second metal plate 90 and the second end metal separator 32e may be made of materials of different compositions.

The support member 94 has a groove 94a accommodating the second elastic seal member 92. The groove 94a is provided at a position facing the second bead seal 62. The second metal plate 90 is provided to extend across the groove 94a. The second elastic seal member 92 is elastically compressed, and in this state, the second elastic seal member 92 is held between the second metal plate 90 and the groove 94a. Therefore, the second elastic seal member 92 tightly contacts the second metal plate 90 and the bottom of the groove 94a to form an air-tight seal.

The support member 94 includes a recess 94b having the groove 94a. The second metal plate 90 is accommodated in the recess 94b. A gap G for allowing thermal expansion of the second metal plate 90 is provided between an inner peripheral end 90e1 of the second metal plate 90 and a side wall surface 94bs1 of the recess 94b facing the inner peripheral end 90e1. A gap G for allowing thermal expansion of the second metal plate 90 is provided between an outer peripheral end 90e2 of the second metal plate 90 and a side wall surface 94bs2 of the recess 94b facing the outer peripheral end 90e2. That is, the gap G provided on each of the inner peripheral side and the outer peripheral side of the second metal plate 90 is a buffer which absorbs heat expansion difference between the second metal plate 90 and the support member 94. The gap G is provided over the entire periphery on the inner peripheral side and the outer peripheral side of the second metal plate 90. The recess 94b surrounds the recess 76a accommodating the terminal plate 16a over the entire periphery.

A resin member 56 is interposed between the ridge of the second bead seal 62 and the second metal plate 90. The resin member 56 contacts the second metal plate 90. The support member 94 is part of the insulator 18a.

That is, the support member 94 is formed integrally with the insulator 18a. It should be noted that the support member 94 may be a member (e.g., frame shaped member surrounding the insulator 18a) provided separately from the insulator 18a.

For example, the first elastic seal member 82 and the second elastic seal member 92 are made of elastic polymer material (rubber material). Examples of such polymer material include a silicone rubber, acrylic rubber, and nitrile rubber.

Figure 7:
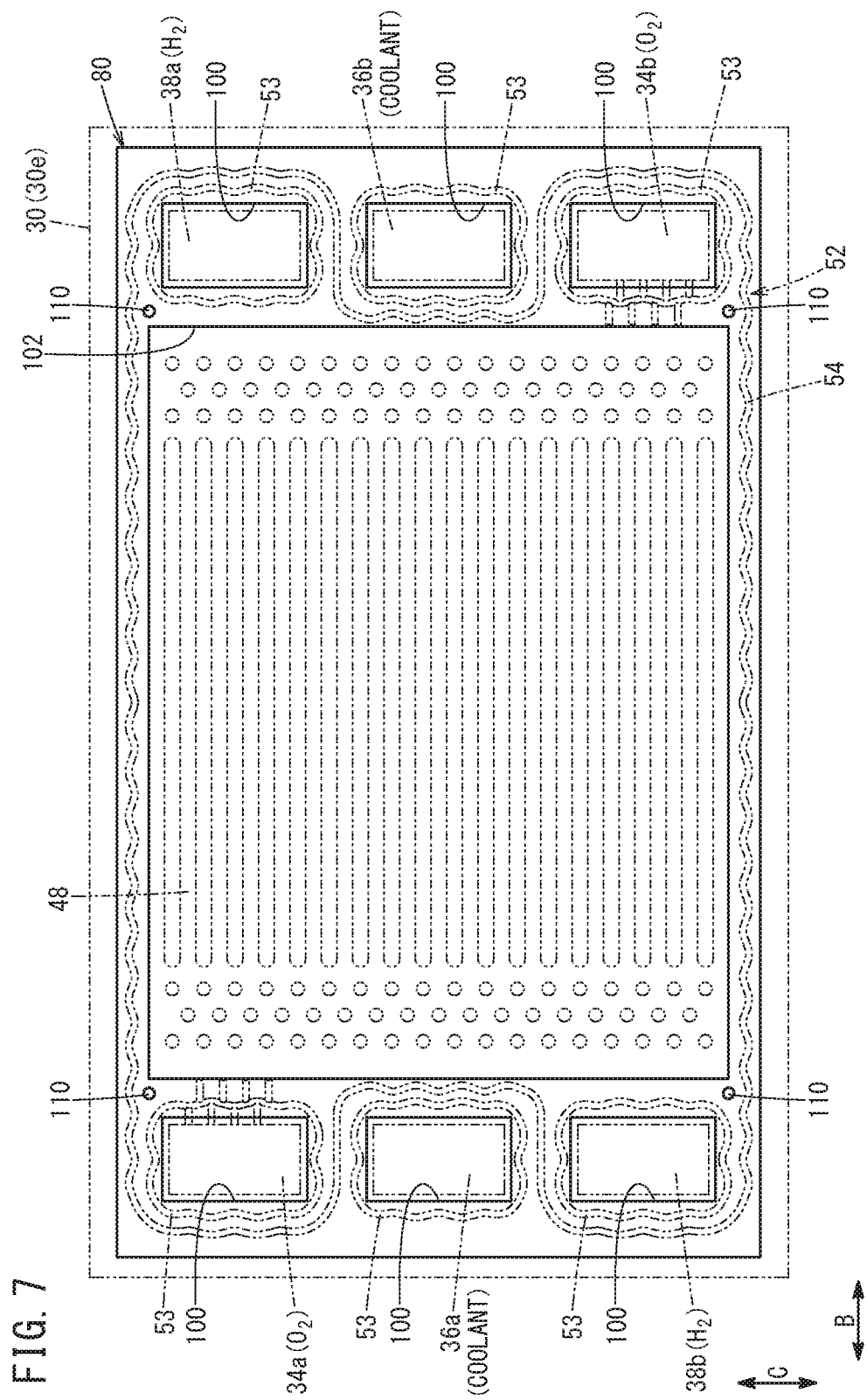
FIG. 7 is a front view showing a first metal plate.

As shown in FIG. 7, the outer shape of the first metal plate 80 is a rectangular shape. As a whole, the first metal plate 80 has a frame shape along the outer shape of the first metal separator 30. The first metal plate 80 is a continuous single plate facing the outer bead 54 and the plurality of passage beads 53.

A plurality of end openings 100 are provided at both ends of the first metal plate 80 in the longitudinal direction. The end openings 100 face the plurality of fluid passages 34a, 34b, 36a, 36b, 38a, 38b, respectively. A central opening 102 is provided at the center of the first metal plate 80 in the longitudinal direction (between the plurality of end openings 100 at one end in the longitudinal direction and the plurality of end openings 100 at the other end in the longitudinal direction). The central opening 102 face a power generation area of the membrane electrode assembly 28*a* (see FIGS. 3 and 4). The first metal plate 80 is overlapped with the entire outer bead 54 and the entire fluid passage beads 53 as viewed in the stacking direction.

In FIG. 3, the second metal plate 90 has the same structure as the first metal plate 80. Therefore, the detailed description of the second metal plate 90 will be omitted.

Figure 8:
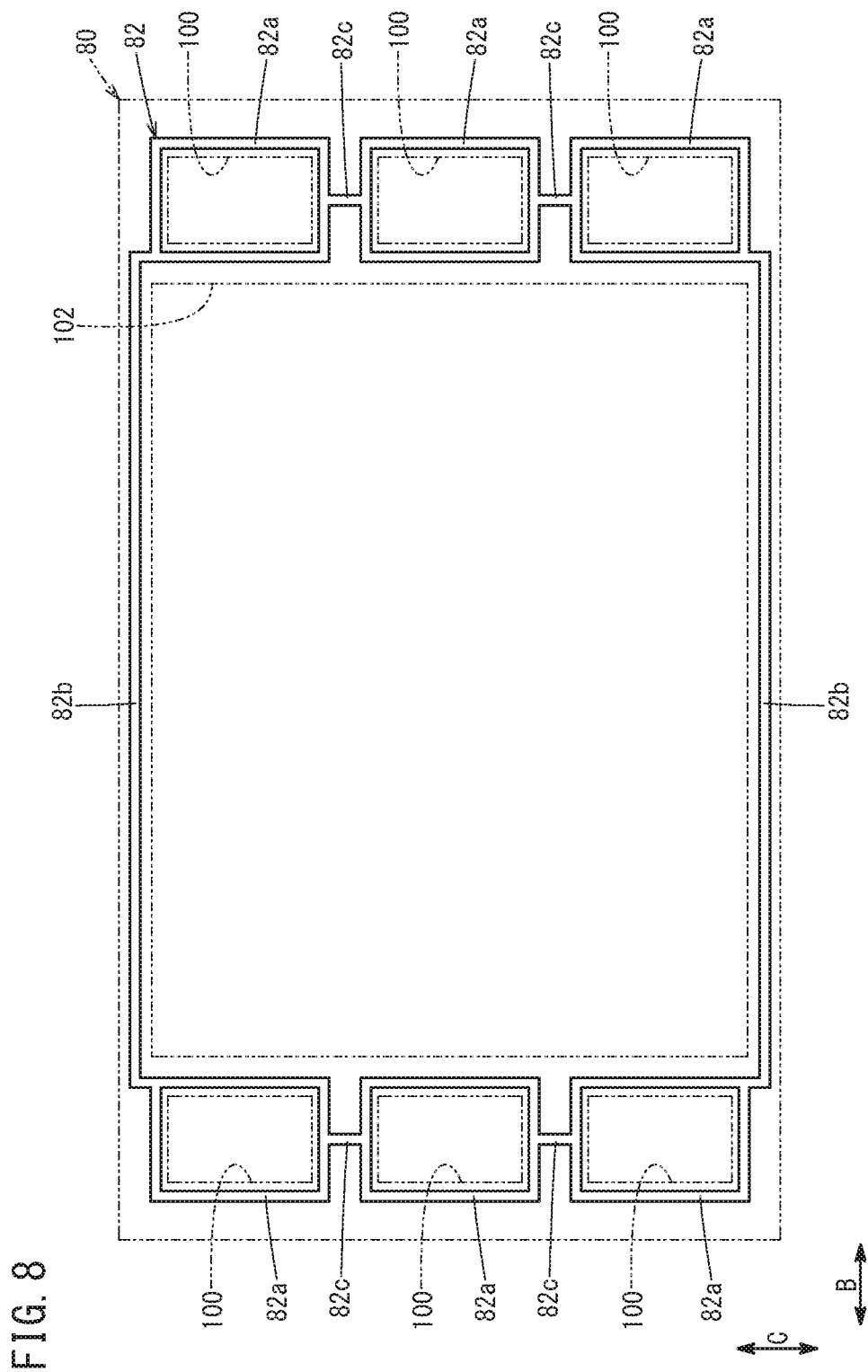
FIG. 8 is a front view showing a first elastic seal member.

As shown in FIG. 8, the first elastic seal member 82 includes a plurality of passage seals 82*a* provided around the plurality of end openings 100 of the first metal plate 80, respectively, and a pair of outer seals 82*b* extending along the opposite long sides of the first metal plate 80. The plurality of passage seals 82*a* are provided at positions facing the plurality of passage beads 53 provided for the first metal separator 30. The pair of outer seals 82*b* are provided at positions facing the portion of the outer bead 54 provided for the first metal separator 30 extending along the long sides of the first metal plate 30.

At one end of the first metal plate 80 in the longitudinal direction, the passage seals 82*a* that are adjacent to each other are coupled by a coupling part 82*c*. At the other end of the first metal plate 80 in the longitudinal direction, the passage seals 82*a* that are adjacent each other are coupled by a coupling part 82*c*. The pair of outer seals 82*b* are coupled to the plurality of passage seals 82*a* on one side and the plurality of passage seals 82*a* on the other side, respectively. Therefore, the first elastic seal member 82 is a member formed by coupling the plurality of passage seals 82*a* and the pair of outer seals 82*b* together integrally.

Figure 10:
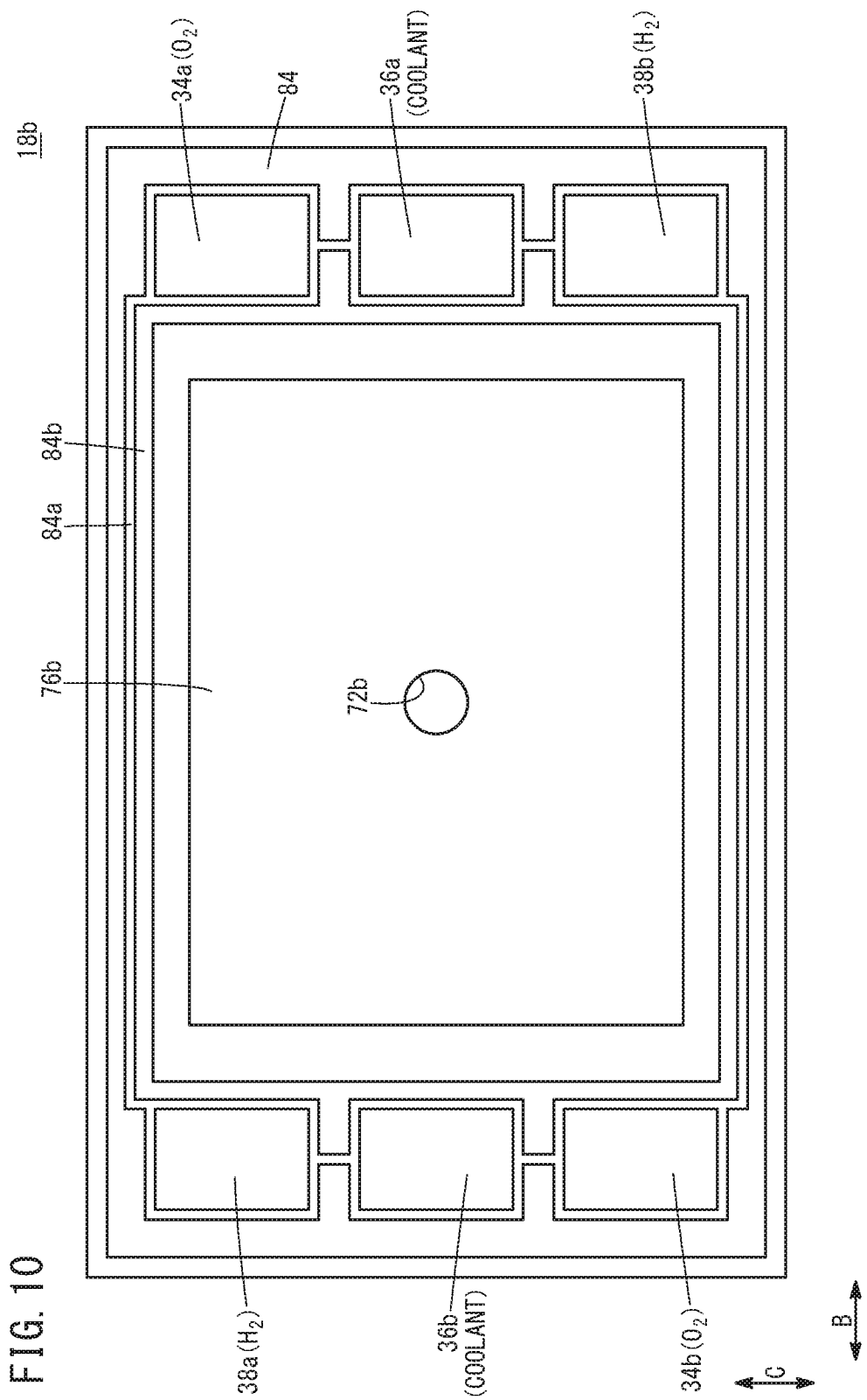
FIG. 10 is a front view showing the other of the insulators.

As shown in FIG. 10, the groove 84*a* provided in the insulator 18*b* (support member 84), for accommodating the first elastic seal member 82 is formed along the shape of the first elastic seal member 82 (FIG. 8).

In FIG. 3, since the second elastic seal member 92 has the same structure as the first elastic seal member 82, the detailed description of the second elastic seal member 92 will be omitted.

Figure 9:
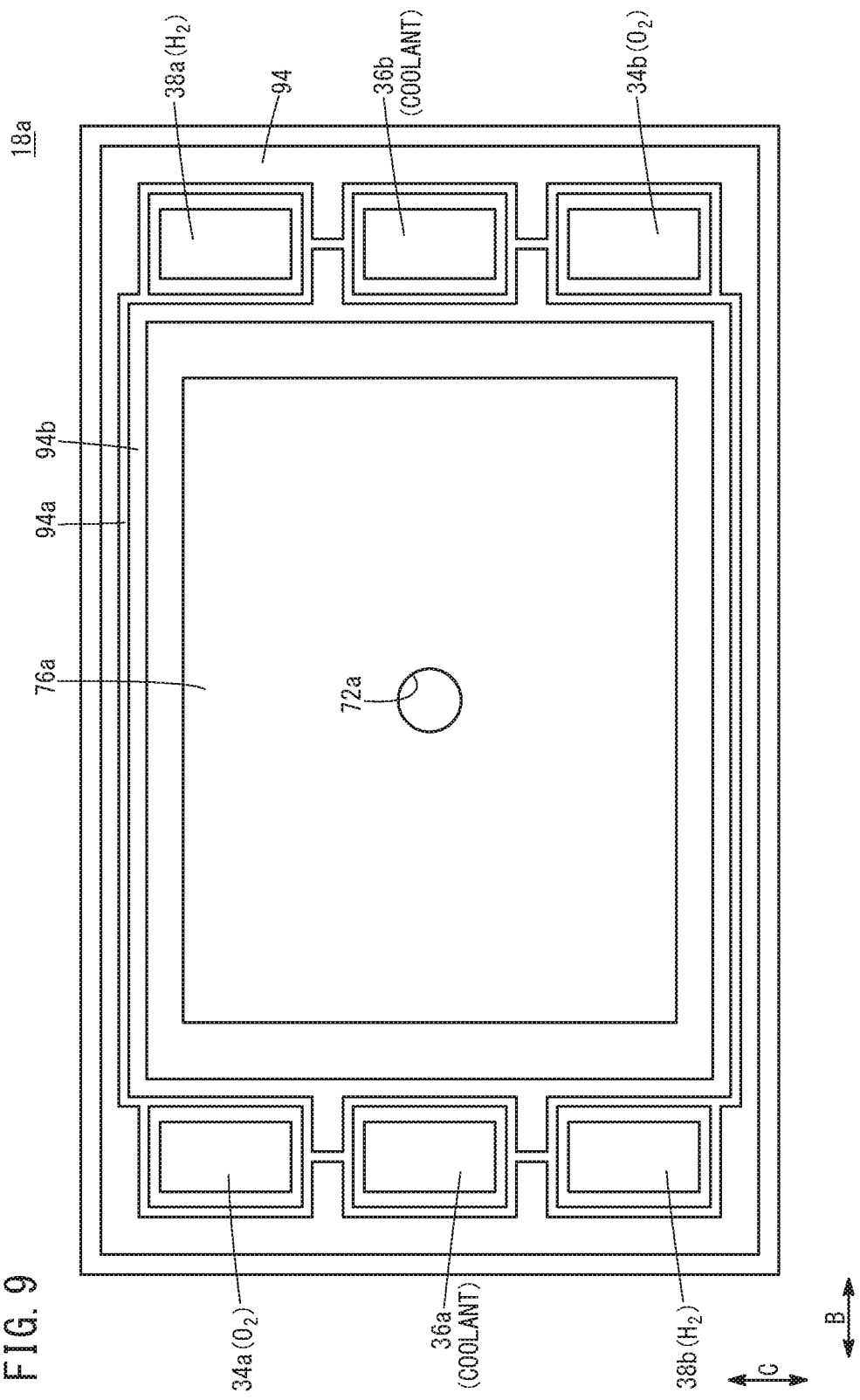
FIG. 9 is a front view showing one of insulators.

As shown in FIG. 9, the groove 94*a* provided in the insulator 18*a* (support member 94), for accommodating the second elastic seal member 92 is formed along the shape of the second elastic seal member 92.

Figure 11A:
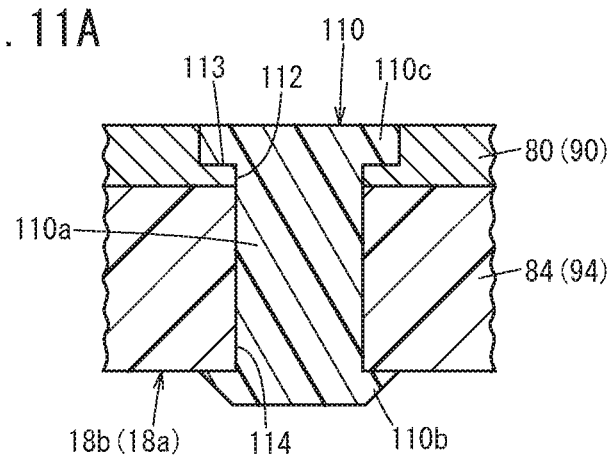
FIG. 11A is a cross sectional view showing a positioning member and its peripheral structure according to a first aspect.

As shown in FIG. 11A, the first metal plate 80 is held by a support member 84 through a positioning member 110. That is, the first metal plate 80 and the support member 84 are joined together by the positioning member 110. The positioning member 110 which joins the first metal plate 80 and the support member 84 together is provided at a position where the first elastic seal member 82 (see FIG. 3) is not present.

Likewise, the second metal plate 90 is held by the support member 94 through a positioning member 110. That is, the second metal plate 90 and the support member 94 are joined together by the positioning member 110. The positioning member 110 which joins the second metal plate 90 and the support member 94 is provided at a position where the second elastic seal member 92 (see FIG. 3) is not present.

The positioning member 110 which joins the first metal plate 80 and the support member 84 together and the positioning member 110 which joins the second metal plate 90 and the support member 94 together have the same structure. Therefore, hereinafter, as a representative example, the positioning member 110 which joins the first metal plate 80 and the support member 84 together will be described in detail.

The positioning member 110 according to a first aspect is a coupling member made of rubber material which penetrates through the first metal plate 80 and the support member 84, and locks the first metal plate 80 and the support member 84 together. As shown in FIG. 7, a plurality of the positioning members 110 are provided at intervals, along the frame shape of the first metal plate 80.

The rubber material of the positioning member 110 may be selected from those listed as examples of the materials of the first elastic seal member 82 and the second elastic seal member 92.

Figure 11B:
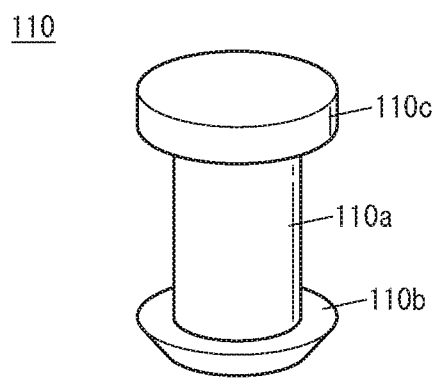
FIG. 11B is a perspective view showing the positioning member according to the first aspect.

As shown in FIG. 11B, the positioning member 110 includes an axial part 110*a*, a first locking part 110*b* having a flange shape provided at one end of the axial part 110*a*, and a second locking part 110*c* having a flange shape provided at the other end of the axial part 110*a*. As shown in FIG. 11A, the axial part 110*a* is inserted into a through hole 112 formed in the first metal plate 80, and a through hole 114 formed in the support member 84.

The outer diameter of the first locking part 110*b* is larger than the outer diameter of the axial part 110*a* and the diameter of the through hole 114. The first locking part 110*b* is engaged with a surface of the support member 84 opposite to the first metal plate 80. The outer diameter of the second locking part 110*c* is larger than the outer diameter of the axial part 110*a* and the diameter of the through hole 112. The second locking part 110*c* is provided on the first metal plate 80, and accommodated in a ring shaped recessed step 113 surrounding the through hole 112.

As shown in FIG. 1, in the fuel cell stack 10, the coupling bars 24 are fixed to the inner surfaces of the end plates 20*a*, 20*b*, respectively using the bolts 26 in a manner that the first bead seal 52 and the second bead seal 62 are deformed elastically, to apply a tightening load to the cell stack body 14 in the stacking direction. Therefore, the first bead seal 52 and the second bead seal 62 are deformed elastically in a manner that the first bead seal 52 and the second bead seal 62 hold the resin film 46 in the stacking direction. That is, since the elastic force of the first bead seal 52 and the elastic force of the second bead seal 62 are applied to the resin film 46, leakage of the oxygen-containing gas, the fuel gas, and the coolant is prevented.

Next, operation of the fuel cell stack 10 having the above structure will be described below.

Firstly, as shown in FIG. 1, an oxygen-containing gas such as the air is supplied to the oxygen-containing gas supply passage 34*a* of the end plate 20*a*. The fuel gas such as the hydrogen-containing gas is supplied to the fuel gas supply passage 38*a* of the end plate 20*a*. A coolant such as pure water, ethylene glycol, oil is supplied to the coolant supply passage 36*a* of the end plate 20*a*.

As shown in FIG. 4, the oxygen-containing gas flows from the oxygen-containing gas supply passage 34*a* into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 42 of the membrane electrode assembly 28*a*.

In the meanwhile, the fuel gas flows from the fuel gas supply passage 38*a* into the fuel gas flow field 58 of the second metal separator 32. The fuel gas flows along the fuel gas flow field 58 in the direction indicated by the arrow B, and the fuel gas is supplied to the anode 44 of the membrane electrode assembly 28*a*.

Thus, in each of the membrane electrode assembly 28*a*, the oxygen-containing gas supplied to the cathode 42 and the fuel gas supplied to the anode 44 are partially consumed in the electrochemical reactions in the first electrode catalyst layer 42*a* and the second electrode catalyst layer 44*a* to perform power generation.

Then, after the oxygen-containing gas supplied to the cathode 42 is partially consumed at the cathode 42, the oxygen-containing gas is discharged along the oxygen-containing gas discharge passage 34*b* in the direction indicated by the arrow A. Likewise, after the fuel gas supplied to the anode 44 is partially consumed at the anode 44, the fuel gas is discharged along the fuel gas discharge passage 38*b* in the direction indicated by the arrow A.

Further, the coolant supplied to the coolant supply passage 36*a* flows into the coolant flow field 66 formed between the first metal separator 30 and the second metal separator 32, and thereafter, the coolant flows in the direction indicated by the arrow B. After the coolant cools the membrane electrode assembly 28*a*, the coolant is discharged from the coolant discharge passage 36*b*.

In this case, the fuel cell stack 10 according to the embodiment of the present invention offers the following advantages.

As shown in FIG. 3, in the fuel cell stack 10, the first metal plate 80 which has a rigidity higher than that of the first elastic seal member 82 and which is supported by the support member 84 is disposed between the first bead seal 52 and the first elastic seal member 82. Therefore, unlike the case of using the seal member which is made of elastic material entirely, when a compression load is applied in the stacking direction, it is possible to prevent inclination of the first bead seal 52. The portion between the support member 84 (insulator 18*b*) and the first metal plate 80 is sealed by elastic deformation of the first elastic seal member 82. Further, since the first bead seal 52 is supported by the first metal plate 80, it is possible to prevent movement of the position of the first bead seal 52 in the stacking direction, and suppress application of the excessive compression load to the metal separators 30, 32. Further, since both of the first metal plate 80 and the first end metal separator 30*e* are made of metal, and have substantially the same linear expansion coefficient, when thermal expansion or thermal contraction occurs due to the temperature change, it is possible to prevent displacement of the contact position between the first metal plate 80 and the first bead seal 52. Therefore, in the first bead seal 52, it is possible to achieve the desired sealing performance.

In the fuel cell stack 10, since the second metal plate 90 which has a rigidity higher than that of the second elastic seal member 92, and which is supported by the support member 94 is disposed between the second bead seal 62 and the second elastic seal member 92, it is possible to prevent inclination of the second bead seal 62. The portion between the support member 94 (insulator 18*a*) and the second metal plate 90 is sealed by elastic deformation of the second elastic seal member 92. Further, since the second bead seal 62 is supported by the second metal plate 90, it is possible to prevent movement of the position of the second bead seal 62 in the stacking direction, and suppress application of the excessive compression load to the metal separators 30, 32. Further, since both of the second metal plate 90 and the second end metal separator 32*e* are made of metal, and have substantially the same linear expansion coefficient, when thermal expansion or thermal contraction occurs due to the temperature change, it is possible to prevent displacement of the contact position between the second metal plate 90 and the second bead seal 62. Therefore, in the second bead seal 62, it is possible to achieve the desired sealing performance.

As shown in FIG. 11A, the first metal plate 80 is held by the support member 84 through the positioning member 110. In the structure, positioning at the time of assembling operation can be performed easily, and it is possible to maintain the suitable gap G (see FIG. 3) by positional limitation. Further, since it is possible to prevent detachment of the first metal plate 80 from the support member 84 at the time of assembling operation, it is possible to improve the assembling performance. Further, the same advantages as described above can be offered by the positioning member 110 provided on the part of the second metal plate 90.

The positioning member 110 is a coupling member made of rubber material which penetrates through the first metal plate 80 and the support member 84, and locks the first metal plate 80 and the support member 84 together. In the structure, it is possible to more effectively prevent detachment of the first metal plate 80 from the support member 84 at the time of assembling operation. The same advantages as described above can be offered by the positioning member 110 disposed on the part of the second metal plate 90.

As shown in FIG. 3, the support member 84 has the groove 84*a* accommodating the first elastic seal member 82, and the first metal plate 80 is provided to extend across the groove 84*a*. In the structure, it is possible to stably support the first metal plate 80. Likewise, the support member 94 has the groove 94*a* accommodating the second elastic seal member 92, and the second metal plate 90 is provided to extend across the groove 94*a*. In the structure, it is possible to stably support the second metal plate 90.

Since the first metal plate 80 and the first end metal separator 30*e* are made of the same kind of metal material, the linear expansion difference between the first end metal separator 30*e* and the first metal plate 80 is small. Therefore, it is possible to suppress decrease in the sealing performance due to influence of the linear expansion difference. Likewise, since the second metal plate 90 and the second end metal separator 32*e* are made of the same kind of metal material, the linear expansion difference between the second end metal separator 32*e* and the second metal plate 90 is small. Therefore, it is possible to suppress decrease in the sealing performance due to influence of the linear expansion difference.

The resin member 56 is provided on the ridge of the first bead seal 52, and the resin member 56 contacts the first metal plate 80. The first metal plate 80 and the first end metal separator 30*e* are made of the same kind of metal material. Therefore, it is possible to prevent the resin member 56 from being peeled off from the ridge of the first bead seal 52. The resin member 56 is provided on the ridge of the second bead seal 62, and the resin member 56 contacts the second metal plate 90. The second metal plate 90 and the second end metal separator 32*e* are made of the same kind of material. Therefore, it is possible to prevent the resin member 56 from being peeled off from the ridge of the second bead seal 62.

In the fuel cell stack 10, instead of the positioning member 110 having the above structure, positioning members according to other aspects as described below may be adopted.

Figure 12A:
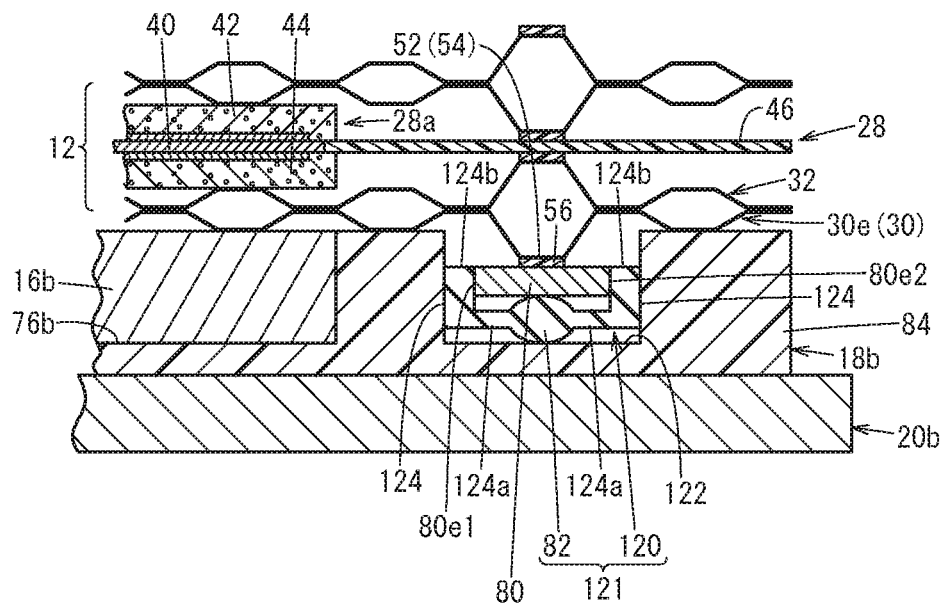
FIG. 12A is a cross sectional view showing a positioning member and its peripheral structure according to a second aspect.

As shown in FIG. 12A, a positioning member 120 according to a second aspect is provided on the first elastic seal member 82, and held between the inner peripheral end 80*e*1 of the first metal plate 80 and a recess 122 provided in the support member 84, and between the outer peripheral end of the first metal plate 80 and the recess 122, respectively. The positioning member 120 is accommodated within the depth of the recess 122.

The second elastic seal member 92 (see FIG. 2) is also provided with the positioning member 120. However, as a representative example, the positioning member 120 provided on the first elastic seal member 82 will be described below.

As shown in FIG. 12A, the positioning member 120 is formed integrally with the first elastic seal member 82. The first elastic seal member 82 and the positioning member 120 form a positioning seal member 121. For example, the rubber material of the positioning member 120 may be selected from those listed as examples of the materials of the first elastic seal member 82 and the second elastic seal member 92.

The recess 122 provided in the support member 84 has a shape configured to accommodate the first metal plate 80 and the positioning member 120. Though not shown in detail, the groove 84*a* (see FIG. 3) is provided in a portion of the support member 84 where the positioning member 120 is not provided. That is, the first elastic seal member 82 is accommodated in the recess 122 which is wider than the groove 84*a* (see FIG. 3), in the portion where the positioning member 120 is provided, and accommodated in the groove 84*a* (see FIG. 3), in the portion where the positioning member 120 is not provided.

As shown in FIG. 12A, the positioning member 120 includes a pair of L-shaped projections 124 protruding from the first elastic seal member 82. Each of the projections 124 includes a root 124*a* positioned adjacent to the first elastic seal member 82, and a front end 124*b* bent from the root 124*a*. One of the front ends 124*b* is held between the inner peripheral end 80*e*1 of the first metal plate 80 and the recess 122 in an elastically compressed state. The other of the front ends 124*b* is held between the outer peripheral end 80*e*2 of the first metal plate 80 and the recess 122 in an elastically compressed state. The first metal plate 80 is held between one of the front ends 124*b* and the other of the front ends 124*b*. The thickness of the root 124*a* is smaller than the thickness of the first elastic seal member 82.

Figure 12B:
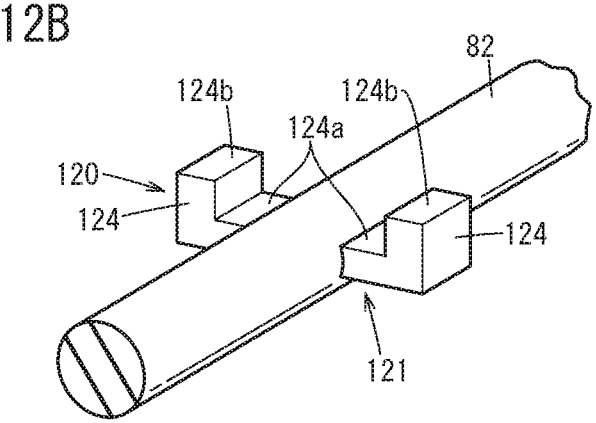
FIG. 12B is a perspective view showing the positioning member according to the second aspect.

As shown in FIG. 12B, the positioning member 120 is not provided over the entire first elastic seal member 82, but provided over partial length of the first elastic seal member 82. That is, the positioning member 120 protrudes from part of the first elastic seal member 82 in a direction in which the first elastic seal member 82 extends. The positioning member 120 protrudes from the first elastic seal member 82 in opposite directions.

Figure 13:
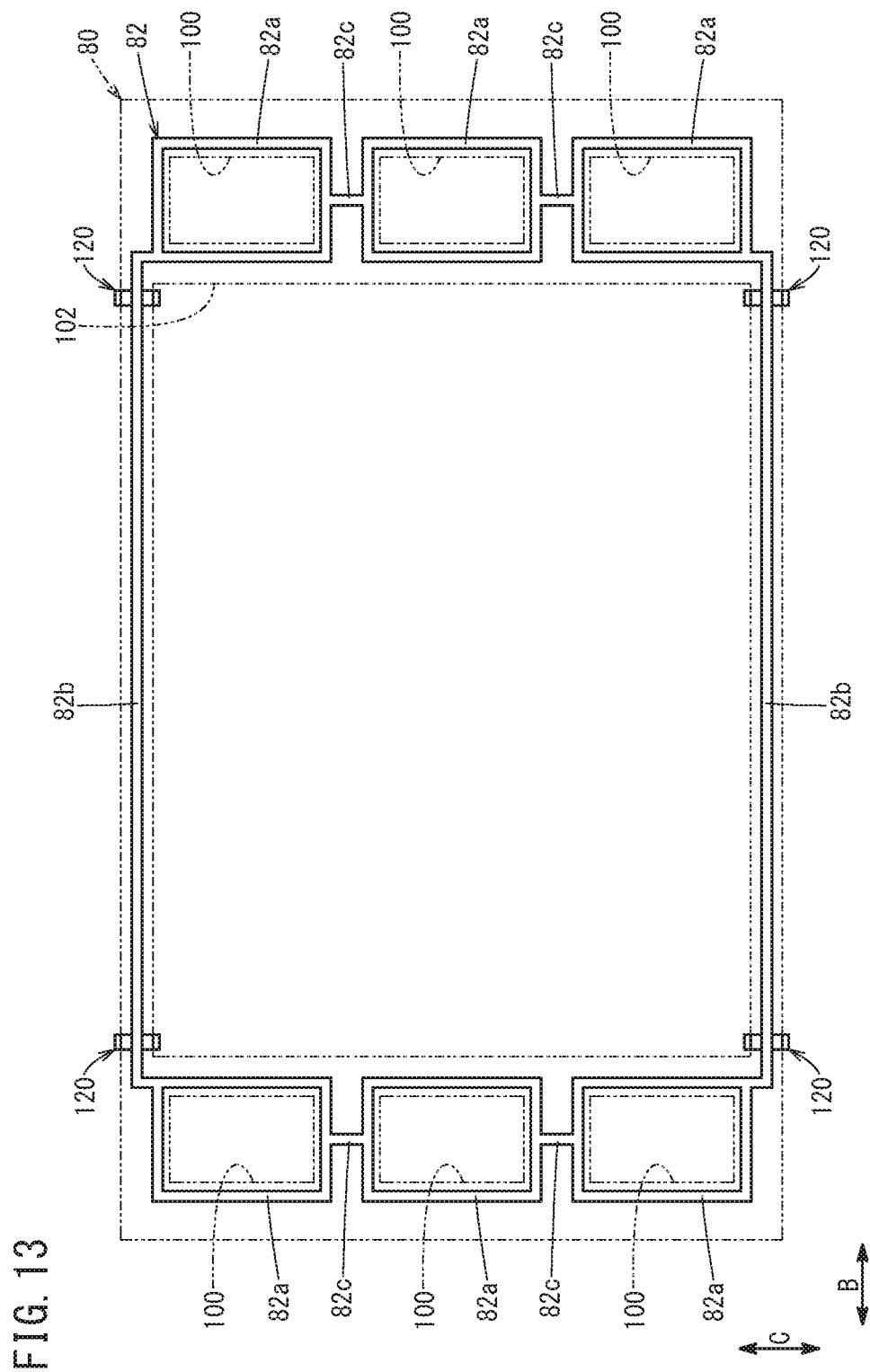
FIG. 13 is a front view showing a first elastic seal member provided with a positioning member according to a second aspect.

As shown in FIG. 13, the plurality of positioning member 120 are provided adjacent to four corners of the first elastic seal member 82 having a quadrangular shape as a whole (both ends of the outer seal 82*b*). That is, the positioning members 120 are provided at one pair of diagonal positions, and the other pair of diagonal positions of the first elastic seal member 82 having a quadrangular shape as a whole. It should be noted that the positioning member 120 may be provided only at one pair of diagonal positions of the first elastic seal member 82.

In the case where the positioning member 120 according to the second aspect is used, since the positioning member 120 and the first elastic seal member 82 are joined together, it is possible to reduce the number of component parts, and improve the assembling performance. Further, since the positioning member 120 and the second elastic seal member 92 are joined together, it is possible to reduce the number of component parts, and improve the assembling performance.

Figure 14A:
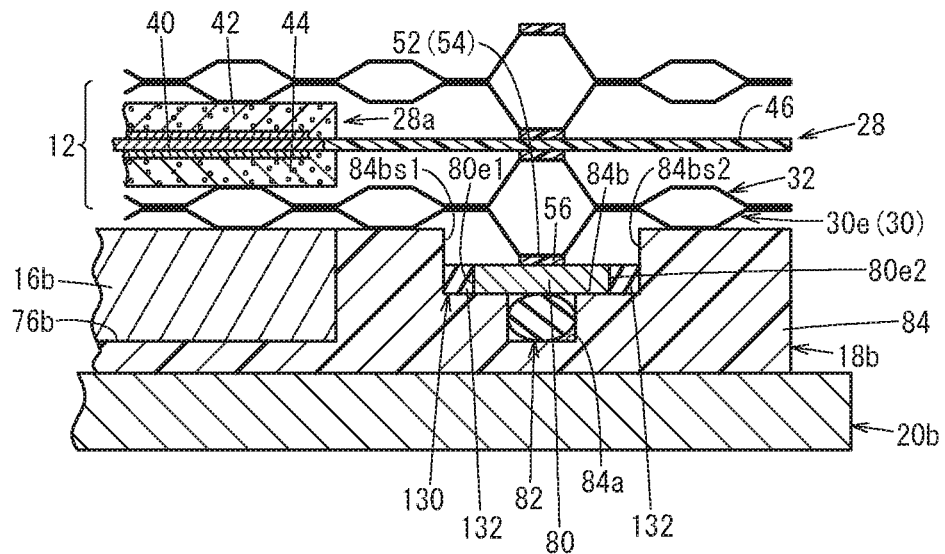
FIG. 14A is a cross sectional view showing a positioning member and its peripheral structure according to a third aspect.
Figure 14B:
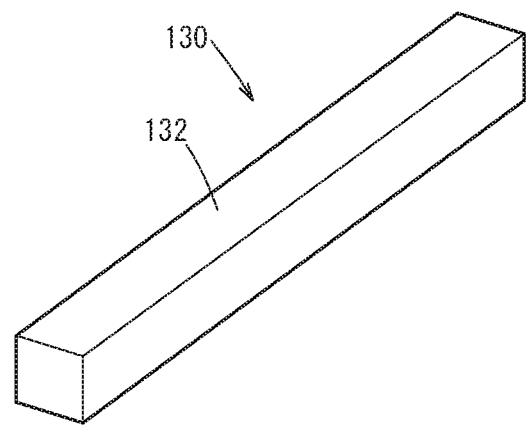
FIG. 14B is a perspective view showing the positioning member according to the third aspect.

As shown in FIG. 14A, a positioning member 130 according to a third aspect includes a pair of rubber members 132 held between the inner peripheral end 80*e*1 of the first metal plate 80 and the side wall surface 84*bs*1 of the recess 84*b*, and between the outer peripheral end 80*e*2 of the first metal plate 80 and the side wall surface 84*bs*2 of the recess 84*b*, respectively, in an elastically compressed state. The plurality of positioning members 130 are disposed at intervals along the shapes of inner periphery and outer periphery of the first metal plate 80. The first metal plate 80 is held between one of the rubber members 132 and the other of the rubber members 132. The rubber members 132 are accommodated within the depth of the recess 84*b*. The rubber members 132 have a rod shape extending along the inner peripheral end 80*e*1 and the outer peripheral end 80*e*2 of the first metal plate 80 (see FIG. 14B).

In the case of using the positioning member 130 according to the third aspect, with the simple and economical structure, it is possible to realize positional limitation and detachment prevention of the first metal plate 80. It should be noted that the positioning member 130 is disposed in the recess 94*b* accommodating the second metal plate 90 in the same manner. Therefore, by the positioning member 130, it is possible to realize position limitation and detachment prevention of the second metal plate 90.

Figure 15A:
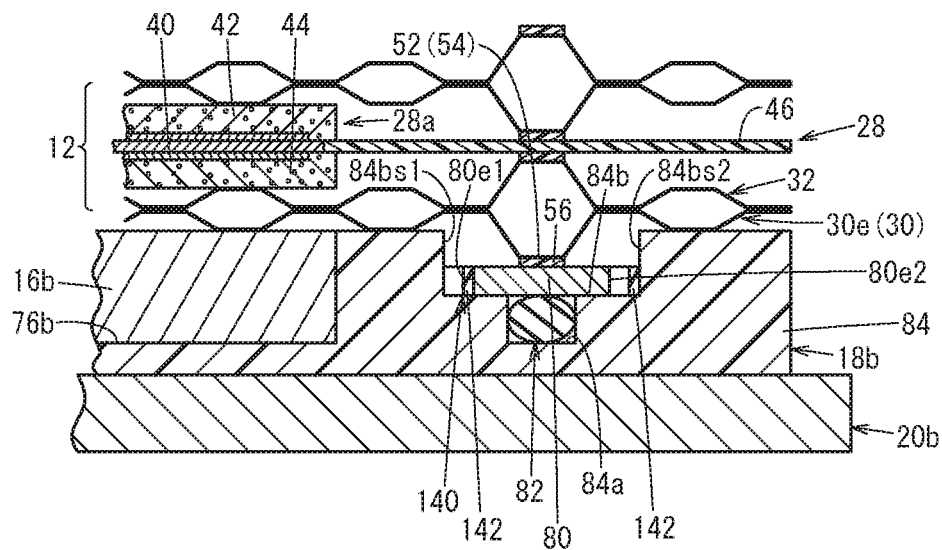
FIG. 15A is a cross sectional view showing a positioning member and its peripheral structure according to a fourth aspect.
Figure 15B:
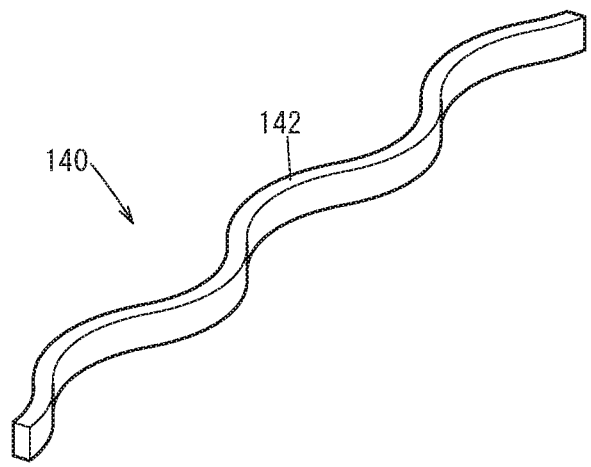
FIG. 15B is a perspective view showing the positioning member according to the fourth aspect.

As shown in FIG. 15A, a positioning member 140 according to a fourth aspect includes a pair of wavy springs 142 (see also FIG. 15B) held between the inner peripheral end 80*e*1 of the first metal plate 80 and the recess 84*b*, and between the outer peripheral end 80*e*2 of the first metal plate 80 and the recess 84*b*, respectively. A plurality of the positioning members 140 are disposed at intervals along inner periphery and outer periphery of the first metal plate 80. Examples of materials of the wavy springs 142 include metal, resin, etc. The first metal plate 80 is held between one of the wavy springs 142 and the other of the wavy springs 142. The wavy springs 142 have a wavy shape having amplitude in the width direction of the recess 84*b*. The positioning member 140 is accommodated within the depth of the recess 84*b*.

In the case of using the positioning member 140 according to the fourth aspect, with simple structure, it is possible to realize position limitation and detachment prevention of the first metal plate 80. The positioning member 140 is disposed in the recess 94*b* accommodating the second metal plate 90 in the same manner. Therefore, it is possible to realize position limitation and detachment prevention of the second metal plate 90 by the positioning member 140.

In the above embodiment, the first bead seal 52 is formed on the first metal separator 30. The first bead seal 52 protrudes in the stacking direction of the cell stack body 14 in a manner to contact the resin film 46. Further, the second bead seal 62 is provided on the second metal separator 32. The second bead seal 62 protrudes in the stacking direction of the cell stack body 14 in a manner to contact the resin film 46. However, in the present invention, the resin film 46 may not be provided on the outer peripheral portion of the membrane electrode assembly 28*a*. The first bead seal 52 and the second bead seal 62 may contact the outer peripheral portion of the membrane electrode assembly 28*a*.

The embodiment of the present invention adopts each cell cooling structure where the power generation cells 12 each formed by sandwiching the resin film equipped MEA 28 between the first metal separator 30 and the second metal separator 32 are provided, and the coolant flow field 66 is formed at each position between the adjacent power generation cells 12. Alternatively, cell units each including three or more metal separators and two or more membrane electrode assemblies (MEAs), and formed by stacking the metal separators and the membrane electrode assemblies may be provided. In this case, so called skip cooling structure where the coolant flow field is formed at each position between the adjacent cell units is adopted.

In the skip cooling structure, the fuel gas flow field is formed on one surface of the single metal separator, and the oxygen-containing gas flow field is formed on the other surface of the single metal separator. Therefore, one metal separator is provided between the membrane electrode assemblies.

The first elastic seal member 82 and the second elastic seal member 92 may extend in a wavy pattern in a plan view viewed in the stacking direction, as in the case of the first bead seal 52 and the second bead seal 62.

The fuel cell stack according to the present invention is not limited to the above described embodiment. It is a matter of course that various structures may be adopted without departing from the gist of the present invention.

The above embodiment will be summarized as follows:

The above embodiment discloses the fuel cell stack (10) including the cell stack body (14) including the plurality of power generation cells stacked in the stacking direction, the power generation cells each including the membrane electrode assembly (28*a*) and the metal separators (30, 32) provided on both sides of the membrane electrode assembly, respectively, wherein the cell stack body includes end metal separators (30*e*, 32*e*) positioned at both ends of the power generation cells in the stacking direction, the bead seal (52, 62) is formed integrally with each of the end metal separators, the bead seal protruding outward in the stacking direction in order to prevent leakage of fluid, the metal plate (80, 90) and the elastic seal member (82, 92) are overlapped with each other at positions facing the bead seal, and the metal plate has a frame shape, and is supported by the support member (84, 94) made of resin and provided between the bead seal and the elastic seal member, the support member has the recess (84*b*, 94*b*) accommodating the metal plate, and the gap (G) is provided between the inner peripheral end of the metal plate and the recess, or between the outer peripheral end of the metal plate and the recess, for absorbing thermal expansion difference between the metal plate and the support member.

The metal plate may be held by the support member through the positioning member (110, 120, 130, 140) made of rubber material or comprising a spring.

The positioning member (110) may comprise the coupling member made of rubber material which penetrates through the metal plate and the support member in the thickness direction, and locks the metal plate and the support member together.

The positioning member (120) may be provided for the elastic seal member, and held at each of positions between the inner peripheral end of the metal plate and the recess, and between the outer peripheral end of the metal plate and the recess, respectively.

The positioning member (120) may comprise the L-shaped projection protruding from the elastic seal member, and may include the root adjacent to the elastic seal member, and the front end bent from the root.

The positioning member (130) may comprise the rubber member (132) held at each of positions between the inner peripheral end of the metal plate and the recess, and between the outer peripheral end and the recess, in an elastically compressed state.

The positioning member (140) may include the wavy spring (142) held at each of positions between an inner peripheral end of the metal plate and the recess, and between an outer peripheral end of the metal plate and the recess.

The ridge of the bead seal and the elastic seal member may be provided at positions overlapped with each other as viewed in the stacking direction.

The resin member (56) may be interposed between the ridge of the bead seal and the metal plate.

The metal plate and the end metal separator may be made of the same kind of metal material.

The support member may comprise part of insulators (18*a*, 18*b*) provided on both sides of the cell stack body in the stacking direction.

What is claimed is:

1. A fuel cell stack comprising:
   a cell stack body including a plurality of power generation cells stacked in a stacking direction, the power generation cells each including a membrane electrode assembly and metal separators provided on both sides of the membrane electrode assembly, respectively, wherein the cell stack body includes end metal separators positioned at both ends of the power generation cells in the stacking direction;
   a bead seal is formed integrally with each of the end metal separators, the bead seal protruding outward in the stacking direction in order to prevent leakage of fluid;
   a metal plate and an elastic seal member are overlapped with each other at positions facing the bead seal; and
   the metal plate has a frame shape, and is supported by a support member made of resin and provided between the bead seal and the elastic seal member;
   the support member has a recess accommodating the metal plate; and
   a gap is provided between an inner peripheral end of the metal plate and the recess, or between an outer peripheral end of the metal plate and the recess, for absorbing thermal expansion difference between the metal plate and the support member.

2. The fuel cell stack according to claim 1, wherein the metal plate is held by the support member through a positioning member made of rubber material or comprising a spring.

3. The fuel cell stack according to claim 2, wherein the positioning member comprises a coupling member made of rubber material which penetrates through the metal plate and the support member in a thickness direction, and locks the metal plate and the support member together.

4. The fuel cell stack according to claim 2, wherein the positioning member is provided for the elastic seal member, and held at each of positions between an inner peripheral end of the metal plate and the recess, and between an outer peripheral end of the metal plate and the recess, respectively.

5. The fuel cell stack according to claim 4, wherein the positioning member comprises an L-shaped projection protruding from the elastic seal member, and includes a root adjacent to the elastic seal member, and a front end bent from the root.

6. The fuel cell stack according to claim 2, wherein the positioning member comprises a rubber member held at each of positions between an inner peripheral end of the metal plate and the recess, and between an outer peripheral end of the metal plate and the recess, in an elastically compressed state.

7. The fuel cell stack according to claim 2, wherein the positioning member includes a wavy spring held at each of positions between an inner peripheral end of the metal plate and the recess, and between an outer peripheral end of the metal plate and the recess.

8. The fuel cell stack according to claim 1, wherein a ridge of the bead seal and the elastic seal member are provided at positions overlapped with each other as viewed in the stacking direction.

9. The fuel cell stack according to claim 1, wherein a resin member is interposed between a ridge of the bead seal and the metal plate.

10. The fuel cell stack according to claim 1, wherein the metal plate and the end metal separators are made of the same kind of metal material.

11. The fuel cell stack according to claim 1, wherein the support member comprises part of insulators provided on both sides of the cell stack body in the stacking direction.

* * * * *